United States Patent [19]

Rosensweig

[11] 4,394,281

[45] Jul. 19, 1983

[54] COMPOSITION FOR USE IN A MAGNETICALLY FLUIDIZED BED

[75] Inventor: Ronald E. Rosensweig, Summit, N.J.

[73] Assignee: Exxon Research and Engineering Co., Florham Park, N.J.

[21] Appl. No.: 421,041

[22] Filed: Sep. 22, 1982

Related U.S. Application Data

[63] Continuation-in-part of Ser. No. 218,087, Dec. 19, 1980, Pat. No. 4,368,131, which is a continuation-in-part of Ser. No. 943,384, Sep. 18, 1978, abandoned.

[51] Int. Cl.$^3$ .................. B01J 21/04; B01J 35/02
[52] U.S. Cl. .................................. 252/62.55; 34/1; 34/10; 252/463; 252/477 R; 252/466 J; 428/403; 428/404; 428/900
[58] Field of Search ............... 252/62.55, 463, 466 J, 252/472, 477 R; 428/403, 404, 693, 900; 34/1, 10

[56] References Cited

U.S. PATENT DOCUMENTS

| | | | |
|---|---|---|---|
| 2,967,794 | 1/1961 | Coxe | 148/101 |
| 3,042,543 | 7/1962 | Schuele | 252/62.55 X |

*Primary Examiner*—Jack Cooper
*Attorney, Agent, or Firm*—Llewellyn A. Proctor

[57] ABSTRACT

A composition which exhibits high induced magnetism in a small applied magnetic field when formed into a magnetically stabilized fluidized bed and which comprises particles containing a nonferromagnetic component, or components, composited with one or a plurality of elongated ferromagnetic components oriented and present in each of said particles in relatively low concentration, based on the total volume of the particles; and a process wherein such composite particles are formed into a magnetically stabilized fluidized bed and contacted with a fluid, preferably gas.

5 Claims, No Drawings

COMPOSITION FOR USE IN A MAGNETICALLY FLUIDIZED BED

BACKGROUND OF THE INVENTION AND PRIOR ART

This is a continuation-in-part of application Ser. No. 218,087 filed Dec. 19, 1980, now U.S. Pat. No. 4,368,131, which in turn is a continuation-in-part of application Ser. No. 943,384 filed Sept. 18, 1978, now abandoned.

Recently it has been discovered that a fluidized bed of magnetizable particulate solids can be stabilized when operated under the influence of a magnetic field, and that such a bed is useful for conducting various fluid-solids contacting processes; inclusive particularly of adsorption, absorption, particulate removal and catalytic processes. Notable among these are gas-solids contacting processes primarily designed for particulate capture but which may also feature a catalytic reaction, or reactions; or the process may be primarily designed for conducting a chemical reaction, or reactions, with or without the feature of particulate capture. Processes of this type are conducted with composites wherein a ferromagnetic component is incorporated with the non-ferromagnetic component, or components, to render the composite ferromagnetic.

Like conventional fluidized processes a fluid, notably a gas, is injected upwardly at velocity sufficient to overcome the free fall velocities of the individual particles (due to gravity) and cause bed expansion and fluidization of the particles without sweeping significant amounts of the particles, catalytic or otherwise, from the bed. In conventional fluidized processes, however, the injection of gas at velocity sufficient to produce expansion of the bed (i.e., transform the fixed bed from a fixed packed bed to a fluidized bed) is accompanied by significant bubble formation whereas, in contrast, in a fluidized bed subjected to the influence of a magnetic field at conditions which does not increase the weight of the bed there exists an interim, or quiescent zone wherein there is little, if any, motion exhibited by the particles within the fluidized bed. Thus, within this zone the formatin of bubbles and slugs are virtually eliminated due to the interaction between the fluidized ferromagnetic particles and the magnetic field; operation within such zone characterizing that of a magnetically stabilized bed.

Magnetically stabilized bed processes offer advantages over both fixed and fluidized bed operations. They provide superior operation over conventional fluidized bed operations in that they provide better counter-current contacting, low gas and solids back mixing, and lower particle attrition. They provide better operation as contrasted with fixed bed operations in that they provide lower pressure drop, better ability to transfer solids, and virtually eliminate bed plugging problems. A process disclosing a magnetically stabilized bed and its mode of operation for conducting catalytic reactions, and the capture of particulates to provide a filtering action is disclosed in U.S. Pat. No. 4,115,927 by Ronald E. Rosensweig.

Catalyst composites comprised of ferromagnetic inclusions dispersed within matrices constituted in part of nonferromagnetic materials and the subjection of beds of such particles to the influence of a magnetic field are known; albeit much of the early work dating back over the last decade was done with particulate ferromagnetic materials which were not catalytically active, or possessed of only limited catalytic activity. Thus, e.g., iron powder or steel balls, were of questionable merit as catalysts; or if catalytic to a limited extent, then the ferromagnetic component constituted essentially the whole of the catalyst. In any regard, a reference of Ivanov et al, *Zhurnal Prikladoni Khimii*, 43, 2200-2204 (1970) describes catalytic particles characterized as $Fe_2O_3$ (88.16%), apparently the gamma phase of $Fe_2O_3$ which is magnetic, which were collected together to form a bed and subjected to the influence of a magnetic field. Ivanov et al, *Comptes rendus de l'Academie bulgare des Science*, Tome 23, No. 7, 787-790 (1970) discloses a fluidization process using a ferrochrome catalyst for the conversion of carbon oxide with water vapor in a magnetic field. U.S. Pat. No. 4,115,927, supra, discloses the use of a ferromagnetic nickel containing catalyst, supplied commercially by Chemetron Corporation known as Girdler G87RS in a magnetically stabilized fluidized bed. The catalyst is 40 wt. % nickel on an alumina support, prereduced and stabilized by the manufacturer. Known catalysts of magnetic character are thus characterized as systems wherein irregular shaped ferromagnetic particles, effectively approximating spherical shape, are dispersed in admixture with nonferromagnetic particles, or catalyst composites comprised of ferromagnetic particles effectively of approximately spherical shape incorporated as inclusions within nonferromagnetic materials which act as matrices for the ferromagnetic inclusions.

Whereas magnetically stabilized bed processes which utilize catalysts containing irregular shaped ferromagnetic inclusions, have proven useful in conducting various chemical reactions, notably hydrocarbon conversion reactions, their performance nonetheless falls far short of providing practical, economic commercial gas solid contacting processes. Simply stated, too much energy (and consequently too much cost) is required to maintain an effective magnetic field. Even in the use of a catalyst which contains a high concentration of particles, or inclusions of good ferromagnetic properties which ab initio may be sufficiently magnetic to meet borderline economics, the magnetic properties of the catalyst generally fade and grow poorer as the time of the operation is continued and extended. The problem is intensified due to shock, thermal excursions, or the like such that the bed of catalytic particles is gradually demagnetized as the time of operation of the process is extended.

Composite magnetic catalysts have thus proven far more difficult to magnetize than expected, and until recently it was believed that the geometry of the bed itself was the principal factor determinative of the effective magnetic field strength, $H_e$ developed within a bed, and that $H_e$ was equal to the applied magnetic field strength, $H_a$, diminished by a factor dM, as follows:

$$H_e = H_a - dM \qquad (1)$$

where d, a demagnetization coefficient $(0 < d < 1)$, was determined by the geometry of the entire bed, and the magnetization of M was taken as the volume average of magnetization of the bed. This led to the conclusion that bed geometries having long dimensions in the direction of the field and short dimensions perpendicular to it had low values of d, which were desirable, while geometries having long dimensions perpendicular to the field and short dimensions parallel to it had large, undesirable values of d. Consideration of the value of M also led to the conclusion that the magnetically stabilized fluidized bed, and associated magnetizing coil, should have large dimensions in the direction of the field (the direction in which the magnets align in the case of permanent magnet magnetically stabilized fluidized beds) and small dimensions perpendicular to the field. However, composite magnetic catalysts, as suggested have proven far more difficult to magnetize than expected. Pure ferromagnetic components showed roughly the expected behavior, saturating at the proper value and, when corrected for demagnetization, showed high susceptibilities. Composites which were comprised of admixtures of ferromagnetic and nonferromagnetic components, or composites which contained ferromagnetic inclusions, also saturated at the proper values, but showed low susceptibilities, even when corrected for demagnetization. Applied fields required to achieve a given magnetization proved an order of magnitude higher than predicted, and quite unfeasible for commercial operations.

It was found, however, that the particle itself, not the geometry of the bed per se was the most pertinent consideration determinative of the relation between $H_a$ and $H_c$, and in fact that the shape of the ferromagnetic inclusions, and their spacing and orientation within the particle itself were essential considerations in obtaining sufficiently effective field strengths for a given applied field (application Ser. No. 943,552, by Robert L. Seiver, filed Sept. 18, 1978 now abandoned herewith incorporated by reference). It was found, in fact, that the ferromagnetic inclusions were preferably of cylindrical shape, prolate spheroids or extremely oblate spheroids. Previously known composites with ferromagnetic inclusions effectively of approximately spherical shape have demagnetization coefficients similar to the demagnetization coefficient of a sphere, $d = \frac{1}{3}$. Particles with elongated inclusions, diluted within a nonferromagnetic matrix and used in magnetically stable fluidized beds in such a way that the inclusions had their elongated dimensions substantially parallel to the applied field, provided demagnetization coefficients significantly less than $\frac{1}{3}$. The preferred shapes, it was found, were those having considerably high L/D ratios, suitably L/D ratios ranging at least 2:1, and preferably 4:1, and higher. The best magnetic effects were obtained with particles wherein the elongate ferromagnetic inclusions were present in relatively high volumetric concentration and, the ferromagnetic inclusions were oriented with their long dimensions essentially parallel so that the composite could rotate, or turn in the magnetic field, to line up the long dimensions of the ferromagnetic inclusions parallel to the direction of the applied field.

A process was also developed for the formation of spheroidal or spherical particles, or beads, which exhibited high induced magnetism in a small applied field. The beads are individually comprised of a composite of alumina and elongate ferromagnetic inclusions the long dimensions of which are spaced apart and possessed of a high parallel orientation one inclusion relative to another (application Ser. No. 943,385 by F. X. Mayer et al filed Sept. 8, 1978, herewith incorporated by reference). The process employed in the preparation of the beads requires generally the formation of an admixture of slow gelation hydrogel precursors (including a catalytic component, or components, if desired) and elongated ferromagnetic particles, parallel orientation of the particles within the hydrogel precursor in a magnetic field prior to gelation, formation of the admixture into beads, and gelation of the beads by passage through a hot immiscible liquid medium. Subsequently the composite is aged, or otherwise treated to develop the desired physical properties; and a catalytic component, or components, if not already added to the composite, is incorporated by impregnation, if desired.

With these discoveries it became feasible to conduct fluid-solids contacting processes, or catalytic reactions, at high induced magnetism in a small applied field. Nonetheless, further improvements in the amount of magnetism which can be induced within the particles of a magnetically stabilized bed are desired.

It is, accordingly, the primary objective of the present invention to obviate the foregoing and other disadvantages of processes which utilize magnetically stabilized fluidized beds for fluid-solids contacting, inclusive particularly of adsorption, absorption, particulate removal and catalytic processes.

A particular object is to provide a magnetically stabilized fluidized bed process across which an external magnetic field can be more effectively applied, i.e., to achieve higher magnetization at a given applied field and ferromagnetic component; or the same applied field with a component possessing less ferromagnetism or a less magnetically susceptible component; or combination of such effects.

A further object is to provide a magnetically stabilized fluidized bed process which utilizes a bed of ferromagnetic solids particles constituted of one or more ferromagnetic inclusions dispersed within a nonferromagnetic matrix material across which a field can be applied in a manner which provides lower demagnetization coefficients.

A more specific object is to provide composites of particulate material wherein magnetically soft ferromagnetic inclusions are dispersed in a matrix of nonferromagnetic material, inclusive particularly of composites of such character which also contain a catalytically active component, or components, these composites being particularly useful in magnetically stabilized fluidized beds for conducting gas-solids contacting, or for conducting catalytic reactions, or both.

These and other objects are achieved in accordance with the present invention which, in general, embodies:

(A) a composition, or article of manufacture, characterized as a particulate material which can be oriented within, and formed into a magnetically stabilized fluidized bed to exhibit high induced magnetism in a small applied magnetic field which comprises:

(i) particles which are of geometrically elongate shape, i.e., prolate spheroidal shape, which have a major axis ranging at least 1.2 times the length of the minor axis, of average diameter (micro axis) ranging from about 10 micrometers ($\mu$m) to about 4000 $\mu$m, preferably from about 50 $\mu$m to about 500 $\mu$m, which contain a nonferromagnetic component, or components, preferably a catalytically active component, or components, composited with a single elongated ferromagnetic component, preferably one which is elongated in substantially the same direction as the direction of elongation of the particle, the ferromagnetic component being multidomain, having dimensions of at least 1 $\mu$m in all directions and a length:diameter (L/D) ratio of at least 2 but not more than 17.3, said ferromagnetic component being present in a composite particle as an inclusion within a nonferromagnetic matrix, a ferromagnetic inclusion being sufficiently spaced apart in the particulate composite that essentially any ferromagnetic inclusion can be circumscribed in an imaginary sphere which does not include or intersect any other ferromagnetic inclusion of said particulate composite, said ferromagnetic particle or inclusion constituting at least 0.5 percent, preferably at least 5 percent, but not more than $3/2(L/D)^2$ of the total volume of each particle, where the L/D ratio is the ratio of the longest dimension of a ferromagnetic inclusion relative to the shortest dimension, and the particles can, in said magnetically stabilized fluidized bed rotate, or turn to line up the long dimensions of the ferromagnetic components parallel to the direction of the field and the short dimensions perpendicular to the direction of the field; or (ii) particles which are of geometrically elongate shape, i.e., prolate spheroidal shape, which have a major axis ranging at least 1.2 times the length of the minor axis, of average diameter (minor axis) ranging from about 10 micrometers ($\mu$m) to about 4000 $\mu$m, preferably from about 50 $\mu$m to about 500 $\mu$m, which contain a nonferromagnetic component, or components, preferably a catalytically active component, or components, within each of which is composited a plurality of elongated ferromagnetic components, preferably oriented with their long dimensions essentially parallel, and more preferably the ferromagnetic components are elongated in substantially the same direction as the direction of elongation of the particle, a ferromagnetic component being multidomain, having dimensions of at least 1 $\mu$m in all directions, elongated in one or two dimensions, and having a length:diameter (L/D) ratio of at least 2 but not more than 313, preferably not more than 30, said ferromagnetic components being present in the composite particles as inclusions within a nonferromagnetic matrix, arranged in such a way that essentially any ferromagnetic inclusion can be circumscribed in an imaginary sphere which does not include or intersect any other ferromagnetic inclusion, and oriented in such a way that there is a preferred direction in each particle such that all the ferromagnetic inclusions in that particle have a long dimension essentially parallel with said preferred direction, said preferred direction most preferably lying along the major axis of said particle, the ferromagnetic particles constituting at least 0.5 percent, preferably at least 5 percent, but for particles elongated in one dimension not more than $2\pi/3(L/D+1)^2$, and for particles elongated in two dimensions not more than $\pi/2(L/D+1)$, of the total volume of each particle, so that in said magnetically stabilized fluidized bed, the particles can rotate, or turn to line up the long dimensions of the ferromagnetic components parallel to the direction of the field; and (B) A process wherein the particles as characterized in (A)(i) and (A)(ii), supra, are formed into a magnetically stabilized fluidized bed, and oriented in said magnetic field while contacted with a fluid, preferably a gas to provide a high induced magnetism in a small applied magnetic field.

It has previously found, and disclosed in application Ser. No. 943,552, supra, that the shape of the individual ferromagnetic inclusion, or ferromagnetic inclusions of a particulate composite are far more important than the shape of the bed of said composite particles in the operation of magnetically stabilized fluidized bed processes. A composite particle having a ferromagnetic inclusions, or ferromagnetic inclusions, elongated in one or two dimensions relative to the other dimension, or dimensions of the inclusion, or inclusions, and sufficiently spaced apart from other ferromagnetic inclusions, when formed into a bed, and subjected to a magnetic field provides far higher magnetization in a given applied field than particles containing a ferromagnetic inclusion, or ferromagnetic inclusions otherwise identical, similarly dispersed, or contained in an otherwise similarly structured particulate composition, except that the ferromagnetic inclusion, or inclusions, are spherical or of irregular shape as disclosed in prior art processes. The present invention is based on the further discovery that the geometric shape of the overall particle, not merely the shape per se of the ferromagnetic inclusion, or inclusions, is also important, and that geometrically elongated particles provide higher magnetization than substantially spherical particles. Geometrically elongated particles, the long sides of which are not aligned with the field due to the resultant orientation of the particle in the field as produced by the random alignment of the ferromagnetic inclusions show slightly improved magnetization in an applied field vis-a-vis a particle otherwise similar except that it is spherical; geometrically elongated particles roughly in alignment with the field show considerably increased magnetism vis-a-vis a particles otherwise similar except that it is spherical; and those substantially in alignment with the field show even higher magnetism in the same applied field vis-a-vis a particle otherwise similar except that it is spherical. The magnetism of a particle is even further enhanced where both the particle is elongated, and it contains an elongated ferromagnetic inclusion, or ferromagnetic inclusions. A particle geometrically elongated in substantially the same direction as the direction of elongation of the elongate ferromagnetic inclusion, or ferromagnetic inclusions, will exhibit, in the same field a far higher induced magnetism than a particle otherwise identical except that it is not so elongated. In other words, the magnetic induction effects of geometric shape, and shape of the ferromagnetic inclusion, or inclusions, are cumulative and even greater benefits can be obtained by structuring the particles so that they are elongated in substantially the same direction as a highly elongate ferromagnetic inclusion, or parallelly oriented ferromagnetic inclusions.

The geometric shape of the elongate particle of this invention is one having a major axis (the long axis) of length at least 1.2 times the length of the minor axis (or short axis) of the article. Preferably, the ratio of major axis:minor axis of a particle ranges from about 1.4:1 to about 10:1, and more preferably from about 1.5:1 to about 5:1. These magnetic properties of the elongate particles are further improved, as suggested, substantially cumulatively, by the substantial parallel orientation, or alignment, of the ferromagnetic inclusions, or inclusions, along the major axis of the particle.

The ferromagnetic inclusions, as used in this invention are of essentially any shape, regular or irregular, and at least one dimension is considerably longer than the others. The ferromagnetic inclusions are thus particles elongated along one axis to provide needle-like shapes, or along two axes to provide flat plates, these permitting the use of composites which require low practical fields for conducting commercial magnetically stabilized fluidized bed operations. A needle-like shape, or ferromagnetic particle elongated in one direction for purposes of this invention is defined as a particle having one long axis relative to its other axes, extension in space being generally defined, mathematically, by a set of three intersecting lines extending through the axes of said particle from one boundary to another, each at right angles to the other two. One axis, the major axis, of a needle-like particle is quite long, and the minor axes in contrast are quite short and equal, or substantially equal, in length. Such shape is thus illustrated by an extrudate particle which is of cylindrical shape, having one long axis, a major axis, and two relatively short axes of equal length. In geometric imagery or description, such shapes are those whose surface intercept with the plane defined by the short axes is essentially a circle, square or other equal sided figure but with the planes defined by the long axis and either of the short axes can approximately be described as an elongated ellipse. On the other hand, particles of this invention can be elongated in two directions; such particles having two relatively long axes and one short axis. The two long axes of the particle can be of equal or unequal length, but both are always longer than the third axis which is of shorter length than the other two axes of the particle. Particles wherein the two long axes are equal, or substantially equal, are illustrated by oblate spheroids. Particles wherein the two long axes are unequal are illustrated by prolate disc shaped particles. Again in geometric imagery, the particle surface intercepts form circles or nearly circular ellipses or other equal or nearly equal sided figures with the plane defined by the two long axes but forms planar figures which can be approximated by elongated ellipses with the planes defined by either long axis with the short axis. Shapes wherein the ferromagnetic inclusions are spherical, or effective spheroid cannot be used. Non oriented ferromagnetic inclusions, not truly spherical in the geometrical sense, may yet contain deviations from sphericity which are randomly directed and cancel each other so that they are, in effect spherical; and the sphere, with equal dimensions in all directions, does not provide high induced magnetism. Cylindrical shapes, oblate spheroids, or extremely prolate spheroids are the preferred shapes of the ferromagnetic inclusions. The ferromagnetic inclusions, used in the magnetically stable fluidized bed, necessarily have effective length:diameter (L/D) ratios considerably greater than unity, and are preferably considerably higher. Suitably the L/D ratios of the ferromagnetic inclusions range at least 2:1, preferably from about 5.5:1 to about 313:1. Specifically (1) for a plurality of particles, each containing a single elongated ferromagnetic inclusion the L/D ratio ranges to about 17.3:1, preferably 5.5:1; (2) for a plurality of particles, each containing a plurality of ferromagnetic inclusions elongated in one dimension the L/D ratio ranges to about 19.5:1, preferably 5.5:1; and for a plurality of particles, each containing a plurality of ferromagnetic inclusions elongated in two dimensions the L/D ratios ranges to about 313:1, preferably 30:1.

In the preparation of particulate solids, or catalysts for use in the practice of this invention it is essential that the elongate ferromagnetic particles present in an aggregate of the particles, or as inclusions within a composite, be spaced apart one from another, separated, or present in dilute concentration so that each experiences the applied field.

Specifically, essentially each ferromagnetic inclusion should be sufficiently separated from all others that an imaginary sphere, the Lorentz sphere, can be circumscribed around it, which neither includes nor intersects any other ferromagnetic inclusion, or imaginary sphere around said ferromagnetic inclusion. Simple geometrical considerations show that this condition imposes an upper limit to the volume fraction of the ferromagnetic inclusions in each composite particle, depending on the specific embodiment of the invention, as follows: (1) for a plurality of particles, each containing a single elongated ferromagnetic inclusions, approximating the shape of the inclusions as a cylindrical needle of length L and diameter D, the upper limit is $3/2(L/D)^2$; (2) for a plurality of particles, each containing a plurality of ferromagnetic inclusions elongated in one dimension, approximating the shape of the inclusions as cylindrical needles of average length L and diameter D, the upper limit is $2\pi/3(L/D+1)^2$; and (3) for a plurality of particles, each containing a plurality of ferromagnetic inclusions elongated in two dimensions, approximating the shape of the inclusions as cylindrical discs of diameter L and thickness D, the upper limit is $\pi/2(L/D+1)$. The further requirement that the elongation L/D shall be at least 2 necessarily sets absolute upper limits on the volume fraction of the ferromagnetic inclusions as follows: (1) 37.5%, (2) 23.3%, and (3) 52.4%, respectively, supra. Likewise, the requirement that the ferromagnetic inclusions constitute at least 0.5%, and preferably 5%, of the volume of the particles sets upper limits on the elongation of the ferromagnetic inclusions as follows: (1) the L/D cannot exceed 17.3, preferably 5.5; (2) the L/D cannot exceed 19.5, preferably 5.5; and for (3) the L/D cannot exceed 313, preferably 30, respectively, supra.

It is essential in the formation of particulate solids, or catalysts that the elongate ferromagnetic inclusion, or inclusions be dispersed within the nonferromagnetic material such that it serves as a matrix, or continuous phase surrounding said inclusion, or inclusions. In the formation of catalysts, it is also essential that the catalytic component, or components, be well dispersed upon the surface of the particles in catalytic amounts. The catalytic component, or components, is dispersed to a high surface area state upon the surface of the particles; the particles serving the same function as conventional catalyst supports. In a catalytically effective state of dispersion, a catalytically active concentration of the catalytic component, or components, is present on the surface of the particles in essentially atomically dispersed form, as defined by the size of the crystals of the dispersed catalytic component, or components (length of a side of an assumed cubic crystallite).

The ferromagnetic inclusions are particles elongated along one axis to provide needle-like shapes, or along two axes to provide flat plates, these permitting the use of composites which require low practical fields for conducting commercial magnetically stabilized fluidized bed operations; and low drag when conducting fluids-solids contacting operations. Methods for physically shaping ferromagnetic metals, or ferromagnetic alloys, e.g., by drawing forms to provide needle-like shapes or ball-milling metal powders to form flat platelets having the desired length:diameter ratios are preferred. Illustrative of such ferromagnetic metals, or alloys, are iron, steel, cobalt, nickel, or alloys of nickel and the like. Various ferromagnetic substances, including but not limited to magnetite $Fe_3O_4$, $\gamma$-iron oxide ($Fe_2O_3$), ferrites of the form $XO.Fe_2O_3$, wherein X is a metal or mixture of metals such as Zn, Mg, Cu, etc. can also be employed. Whereas the length of the inclusions are limited by the relatively small dimensions of the particles themselves, the metals can be drawn repetitively until the desired L/D ratios are achieved by limited diemnsions imposed on the diameter of the inclusions. The ferromagnetic inclusions are thus readily formed into shapes having length:diameter ratios ranging from about 5.5:1 to about 100:1, preferably from about 5.5:1 to about 30;1, with nominal diameters ranging from about 0.5 to about 50 microns, preferably from about 1 to about 25 microns. The ferromagnetic inclusions are suitably admixed with the alumina precursor solution, or solutions, in the concentrations required to provide the desired volume dilution, and must be present in the reaction admixture prior to formation of the gel.

The preparation of (i) spheroidal or spherical particles, or beads, comprised of an alumina, or alumina-containing matrix and elongate, oriented ferromagnetic inclusions; or (ii) catalytically active spheroidal or spherical particles, or beads, comprised of an alumina, or alumina-containing matrix, within which is contained oriented elongate ferromagnetic inclusions, and a catalytically active component, or components, either of which provides lower demagnetization coefficients and higher magnetization values when used in a fluidized bed and subjected to an externally applied magnetic field is disclosed in U.S. application Ser. No. 943,385, supra, herewith incorporated by reference. The preparation requires first the formation of a hydrogel precursor solution, or recipe, which contains a hydrous form of alumina and sufficient of a neutralizing agent to form a gel, elongate ferromagnetic particles (or inclusions) in dilute concentration and optionally, a catalytic component, or components. Droplets of the hydrogel precursor, or recipe, are then formed, and the droplets introduced into a quiescent liquid medium, preferably a heated, quiescent liquid medium, within which the droplets are immiscible, and the droplets then passed through the liquid medium while they are subjected to a magnetic field of strength sufficient to orient the long dimensions of said elongate ferromagnetic particles substantially parallel one relative to another, the droplets being gelled to substantially preserve the parallel orientation of the ferromagnetic particles, which form inclusions, as the droplets are passed through the liquid medium. Where the formation of a catalyst is desired, a catalytic component, or components, can then be added; or an additional catalyst component, or components, can be added if a catalyst component, or components, has already been added prior to gelation.

As droplets of the admixture are passed through the quiesent liquid medium, and gelled, they are concurrently subjected to an externally applied magnetic field of strength sufficient to orient the ferromagnetic particles within the droplets parallel one to another with the long dimensions parallel to the direction of the applied field; or conversely, with the short dimensions perpendicular to the direction of the applied field. The application of the field must be continued as the droplets are passed through the liquid medium until such time that the droplets have gelled sufficiently to set, or "freeze" the parallelly aligned elongate ferromagnetic particles in place, as inclusions, within the individual hydrogelled particles. In general, depending on the concentration of the ferromagnetic particles in the droplets, a magnetic field strength ranging from about 50 oersteds to about 500 oersteds, preferably from about 100 oersteds to about 400 oersteds, has been found adequate to parallelly orient the elongate ferromagnetic particles, distort the particles to produce prolate spheroidal shapes wherein the elongate ferromagnetic particles are aligned along the major axis of the particles (dependent to an extent upon the metals loadings), and maintain such orientation of the elongate ferromagnetic particles until the gel has set.

The time required for gelation, time required for passage of the droplets through the liquid medium, and the period over which the particles are subjected to the field are interrelated and of considerable importance. The orientation of the ferromagnetic particles within the droplets must be accomplished, and the orientation maintained prior to the time that the gel has set. Normally, and preferably, the parallel orientation of the elongate ferromagnetic particles is completed within a few seconds after entry, or introduction of the droplets into the quiescent liquid medium. The initial orientation should be produced before the gel has immobilized the ferromagnetic particles to any significant extent, or excessive power may be required to produce the desired orientation. The orientation of the ferromagnetic particles is maintained by continued application of the magnetic field as gelation occurs until such time that the ferromagnetic particles are set, or "frozen" as inclusions within the solids hydrogel particles which should occur just prior to, or simultaneously with the passage of the solids hydrogel particles out of the applied magnetic field.

The relationship between the applied field strength, and gelation rate of the particle is quite important as manifested by the nature of the product that is produced. If, e.g., on passage of the hydrogel particles out of the field, the hydrogel is not sufficiently set, much of the parallel orientation of the ferromagnetic particles will be lost, this effect being particularly accute if the magnetic field strength is too great. The ferromagnetic particles, in such circumstances also often lose their uniformity of dispersion within the solids hydrogel particles by being physically pulled through the particle to one side or another so much so that the shift of the center of gravity of the solids hydrogel particles can actually cause the particles to roll and tumble on exit from the field. The solids hydrogel particles themselves can also become distorted in a relatively intense field at low gelation rates, the pull on the ferromagnetic particles distorting the gelling particle to form prolate spheroids within one end of which the ferromagnetic particles will be concentrated. Also, the crush strength of the solids hydrogel particles can be adversely affected, and may possess insufficient crush strength for effective use in most commercial applications.

My colleagues, in any event, rejected as unsuitable production specimens produced as described in said application Ser. No. 943,385 wherein the admixture contained any significant portion of the distorted specimens, inclusive of those specimens wherein the particles were elongate, including particularly those specimens, characterized as prolate spheroid particles wherein the elongate ferromagnetic inclusions were aligned in the direction of particle elongation viz. aligned in the direction of the major axis of the particle. However, it was my belief not only that such specimens should not be rejected, but that such specific type of the rejected specimens would prove superior to those considered by my colleagues as desirable.

In order to demonstrate the merits, and advantages of my invention, as well as provide a better understanding thereof, a series of non-limiting examples and demonstrations were conducted by selecting, or picking out geometrically elongate particles from the rejected specimens from production lots and testing these to determine the magnetic properties of these particles. The following comparative data illustrates the advantages of using elongated particles, particularly elongated prolate spheroid particles wherein the long sides of the ferromagnetic inclusions are aligned, or oriented, in the direction of the major axis of the particle. In the examples all parts are given in terms of weight units except as otherwise specified.

In a series of runs an attempt was made to prepare alumina spheres containing oriented ferromagnetic particles by a hot oil beading technique. An alumina sol containing 40.7 wt. % aqueous solution of aluminum hydroxide, $Al_2(OH)_5Cl.2H_2O$, was admixed with 31.6 wt. % aqueous solution of hexamethylene tetramine, $(CH_2)_6N_4$ within which was dispersed finely divided elongated 410 stainless steel particles about 20 microns in diameter. This mixture was then dispersed as droplets through a nozzle into a column of immiscible Primol D maintained at 180° F. The column was surrounded by a solenoid shaped permanent magnet, ten inches in length, having a maximum field of 300 oersteds in the linear portion of the field. The gelled particles recovered from the bottom of the column were transparent, containing oriented metal particles visible in the transparent particles appearing like small dark pieces of thread.

In the several runs, the column was under the influence of an axial magnetic field, so the particles are all nominally oriented. The field strength and other operating parameters were such that the column produced principally spherical beads, but happened to produce a few elongated particles as well; these particles in all cases being elongated in the same direction as the orientation of the stainless steel inclusions. The particles were similar in essentially all respects except as regards their shape and hence any differences in magnetic properties can only be attributed to the shape of the particles. Accordingly, to show the effect of physical elongation on the magnetic properties magnetic measurements were individually made on a number of these particulate specimens using a Princeton Applied Research Model 155 Vibrating Sample Magnetometer and a conventional laboratory electromagnet.

The examples given below show the maximum magnetic moment of a particle, both spherical and elongate, at an applied field of 200 oersteds given in terms of emu/g stainless steel (ss), at varying concentrations of stainless steel metals loadings. Where the particles are elongated, the dimensions of both the major and minor axis of the particle is given.

In the data presented, it will be observed that Examples 1 and 2 concern very slightly elongated particles, and the improvement is only slight; in fact, so slight that it is difficult to distinguish the improvement from the normal random bead shape variations. However, Examples 3 and 4 refer to significantly elongated particles, and in these cases the improvement over spherical particles is clearly demonstrated.

EXAMPLE 1

| Particle Shape | Wt. % 410 SS | Diameter, m Major | Diameter, m Minor | Max. Mag. Moment at 200 Oe, emu/g SS |
|---|---|---|---|---|
| Spherical | 10.1 | 1000 | — | 19.3 |
| Spherical | 24.2 | 800 | — | 11.2 |
| Spherical | 16.1 | 1000 | — | 22.2 |
| Elongate | 20.5 | 1000 | 800 | Average 17.8 21.7 |

EXAMPLE 2

| Particle Shape | Wt. % 410 SS | Diameter, m Major | Diameter, m Minor | Max. Mag. Moment at 200 Oe, emu/g SS |
|---|---|---|---|---|
| Spherical | 9.3 | 600 | — | 19.2 |
| Spherical | 26.9 | 600 | — | 22.8 |
| Spherical | 30.6 | 600 | — | 15.2 |
| | | | | Average 19.1 |
| Elongate | 31.4 | 1000 | 800 | 16.7 |

EXAMPLE 3

| Particle Shape | Wt. % 410 SS | Diameter, m Major | Diameter, m Minor | Max. Mag. Moment at 200 Oe, emu/g SS |
|---|---|---|---|---|
| Spherical | 3.8 | 1600 | — | 14.0 |
| Spherical | 20.0 | 2200 | 1200 | 20.1 |

EXAMPLE 4

| Particle Shape | Wt. % 410 SS | Diameter, m Major | Diameter, m Minor | Max. Mag. Moment at 200 Oe, emu/g SS |
|---|---|---|---|---|
| Spherical | 22 | 2000 | — | 13.4 |
| Spherical | 61 | 2000 | — | 11.2 |
| Spherical | 8 | 1100 | — | 11.3 |
| | | | | Average 12.0 |
| Elongate | 5 | 1900 | 1300 | 23.4 |
| Elongate | 14 | 1900 | 1400 | 20.7 |
| | | | | Average 22.0 |

EXAMPLE 5

It is found that there is a strong interaction between the applied orienting field, metals content of the particles, and the shape of the particles produced. At a given metals content it is found that there is a maximum practical orienting magnetic field which may be applied. At conditions otherwise similar, a field below this maximum leads to the formation of a preponderance of spherical shaped particles. Conversely a field in excess of this maximum leads to the formation of major amounts of elongate particles, including particularly particles of prolate spheroidal shape.

The following table is illustrative of particles obtained with varying 410 stainless steel metals loadings with the same recipe, and conditions described for the particles exemplified in the foregoing examples while varying the applied field below a given maximum or minimum for the various metals loadings.

| Wt. 410 SS | Orienting Field, Oersteds |
|---|---|
| 17 | 200 |
| 33 | 120 |
| 60 | 50 |

Thus, by the application of a field below 200 oersteds, i.e., 150–175 oersteds, with 17 wt. % metals loading a majority of the particles produced are essentially of spheroid shape; and above 200 oersteds, i.e., 225–275 oersteds, a majority of the particles produced are of prolate spheroidal shape. By the application of a field below 120 oersteds, i.e., 75–100 oersteds with 33 wt. % metals loadings, a majority of the particles produced are essentially of spheroid shape; and above 120 oersteds, i.e., 140–165 oersteds a majority of these particles produced are prolate spheroidal shape. By the application of a field below 50 oersteds, i.e., 20–40 oersteds, with 60 wt. % metals loadings, a majority of the particles are of spherical shape; and above 50 oersteds 60–80 oersteds, a majority of the particles are of prolate spheroidal shape.

The prolate spheroid shaped particles are preferably used as catalysts, and various catalytic metals can be combined with the finished composite particles including those metals conventionally employed in such processes as fluid catlaytic cracking, reforming, hydrogenation, hydrocracking, isomerization, alkylation, polymerization, oxidation and the like.

The matrix portion of particles is preferably constituted of a refractory porous inorganic oxide. The matrix material constitutes a support with which the catalytic component, or components, is composited, in catalytically effective amount, suitably formed by cogellation with a catalytic metal component, or components, or by impregnation of the particles with a solution which contains a soluble compound, or compounds, of the metal, or metals. The matrix material can be constituted of, or contain, for example, one or more of alumina, bentonite, clay, diatomaceous earth, zeolite, silica, magnesia, zirconia, thoria, and the like. The most preferred matrix material is alumina to which, if desired, can be added a suitable amount of other refractory carrier materials such as silica, zirconia, magnesia, titania, etc., usually in a range of about 1 to 20 percent, based on the weight of the support. Exemplary of a matrix material for the practice of the present invention is one having a surface area of more than 50 m$^2$/g, preferably from about 100 to about 300 m$^2$/g, and higher, a bulk density of about 0.3 to 1.0 g/ml, and higher, an average pore volume of about 0.2 to 1.1 ml/g, and an average pore diameter ranging about 30 Å to about 300 Å, and higher.

When used, e.g., in hydrotreating or hydrofining reactions the catalyst component is one wherein one or more hydrogenating components are added to the finished composites comprising the transition metals as found in Groups IV-B, V-B, VI-B, VII-B, VII, of the Periodic Table of the Elements (Sargent Welch and Company, copyright 1968). Examples of suitable hydrogenating metals include, e.g., nickel, cobalt, molybdenum, tungsten, platinum, palladium, ruthenium, rhenium, iridium, and the like. Mixtures of any two or more of such hydrogenating components can also be employed, e.g., nickel or cobalt, or the combination thereof, in the form of metal, oxide, sulfide or any combination thereof, and molybdenum or tungsten, or the combination thereof, in the form of metal, oxide, sulfide or any combination thereof. The total amount of hydrogenating component supported on the finished material can range from about 2 to 25 percent, preferably 5 to about 20 percent, based on the weight of the catalyst composition. A typical hydrofining catalyst includes from about 3 to about 8 weight percent molybdenum oxide and/or tungsten oxide, calculated as the metal oxide. Reforming catalysts can also be formed, e.g., by compositing with the finished materials a metal, or metals, such as obtained from Group VIII, e.g., platinum, iridium, rhodium, palladium, or the like.

Prolate spheroid particles, each of which contains a single elongated ferromagnetic inclusion, can be prepared as described by reference to application Ser. No. 218,088, filed Dec. 19, 1980, at pages 24 and following, herewith incorporated by reference. Such particles can be prepared by fluidizing a suitable elongated ferromagnetic powder in a conventional fluidized bed, using any sufficiently nonreactive gas, such as air, nitrogen, carbon dioxide, etc., for fluidization. The upper portion of a bed containing an immiscible liquid heated to maintain the top bed temperature in the range of about 140° F. to about 390° F., while a nozzle, or nozzles near the bottom of the bed spray a fine mist of alumina sol into the fluidized mass of particles along with the fluidizing gas. The mist deposits on the individual ferromagnetic particles, and as they move to the top of the bed the sol is dried to form an alumina precursor, such as boehmite, AlO(OH). The particles move back to the bottom of the bed where they are coated with more alumina sol, and this process is continued until the desired amount of alumina precursor has been deposited. During this period the surface tension in the alumina sol causes the particles to have a substantially spherical shape, but particle elongation can be produced by increasing the applied field. The normal turbulence on a vonentional fluidized bed is maintained sufficient to trasport the particles back and forth between the top and bottom of the bed, and, if the sol addition rate is maintained low enough, and sufficient to keep particles from agglomerating. Radio frequency induction heating can provide a convenient way to heat the top of the bed while eliminating any tendency of the particles to stick to heat-transfer surfaces. When the desired amount of alumina precursor has been deposited, the particles are finished by calcining to convert the precursor to alumina, either in a separate vessel, or simply by increasing the power to the radio frequency in the induction coils.

Alternatively, a suitable ferromagnetic material can be mixed with an aqueous solution of aluminium by hydroxychloride and hexamethylene tetramine, in concentrations such that the finished alumina particles will contain on the one hand, an average substantially less than one ferromagnetic inclusion per particle. Droplets of the mixture are added to the top of a hot oil column kept at about 190° F., surface tension causing the droplets to take a spherical form, but particle elongation can be produced by increasing the applied field. The heat causes the alumina solution to gel before the elongated droplets reach the bottom of the column. Magnetic separation is used to separate those particles which do contain one ferromagnetic inclusion from those which do not. The selected, desired particles are further coated and calcined, while those which are not are repeptized with dilute hydrochloric acid and recycled as starting material. This second preparation method is more suitable for particles containing a relatively low volume fraction of ferromagnetic inclusion, while the first preparation is more suitable for preparing particles which contain a relatively high volume fraction of ferromagnetic inclusion. On the other hand, of course, particles can be made which contain a plurality of ferromagnetic inclusions by increasing the concentration of ferromagnetic inclusions in the droplets added to the top of the hot oil column. A magnetic field can be applied across the column to cause parallel orientation of the ferromagnetic particles which, as the particles congeal, become parallelly oriented inclusions within an aluminum matrix.

It is apparent that various modifications and changes can be made without departing the spirit and scope of the invention. For example, the geometric shape can be highly oblate or prolate, and can have a major axis of considerable length relative to the length of the minor axis. The length:diameter ratio of the ferromagnetic inclusions can vary considerably as well as the identity of the ferromagnetic inclusions used in the composite, the nature of the catalytic component, or components, and its manner of incorporation, etc. without departing the spirit and scope of the invention.

Having described the invention, what is claimed is:

1. As a composition of matter, a particulate material which can be oriented within, and formed into a magnetically stabilized fluidized bed to provide high magnetization at a low applied field which comprises particles of geometrically elongate shape which have a major axis at least 1.2 times the length of the minor axis, the particles being of average diameter (minor axis) ranging from about 10 µm to about 4000 µm and contain a nonferromagnetic component, composited with a plurality of elongate ferromagnetic components, the ferromagnetic components being multidomain, having dimensions of at least 1 µm in all directions, elongated in two directions, and having a length:diameter (L/D) ratio of at least 2 and not more than 313, the nonferromagnetic component being comprised of alumina within which said ferromagnetic components are dispersed as inclusions within the interior of the composite particles, and aligned with the major axis of said particles the ferromagnetic components being oriented with their long dimensions essentially parallel, the ferromagnetic components constituting at least 0.5 percent, but not more than $\pi/2(L/D+1)$, of the total volume of each particle, where L/D is the average ratio of the longest dimension of a ferromagnetic inclsuion relative to the shortest dimension, and, in said magnetically stabilized fluidized bed, the particles can rotate, or turn to line up said ferromagnetic components essentially parallel to the direction of the field, and wherein a catalytically effective amount of a catalytically active metal is dispersed on the surface of the composite, and the composite particles are catalytically active.

2. The composition of claim 1 wherein the ratio of the major axis:minor axis of a composite particle ranges from about 1.4:1 to about 10:1.

3. The composition of claim 1 wherein the ratio of the major axis:minor axis of a composite particle ranges from about 1.5:1 to about 5:1.

4. The composition of claim 1 wherein the volume of the ferromagnetic components contained in the composite constitutes at least 5%, but not more than 52.4 percent of the total volume of each particle.

5. The composition of claim 1 wherein the length:diameter ratio of the ferromagnetic particles ranges no higher than about 30.

* * * * *